Jan. 24, 1961 P. F. WITTLIG 2,969,428

METHODS AND APPARATUS FOR TELEVISION MONTAGE

Filed June 30, 1954

2 Sheets-Sheet 1

INVENTOR.
PAUL F. WITTLIG

BY

Campbell, Brumbaugh, Free & Graves
Their ATTORNEYS.

INVENTOR.
PAUL F. WITTLIG
BY
Campbell, Brumbaugh, Free & Graves
his ATTORNEYS.

United States Patent Office 2,969,428

Patented Jan. 24, 1961

2,969,428

METHODS AND APPARATUS FOR TELEVISION MONTAGE

Paul F. Wittlig, Manhasset, N.Y., assignor to Columbia Broadcasting System, Inc., New York, N.Y., a corporation of New York Filed June 30, 1954, Ser. No. 440,379

17 Claims. (Cl. 178—7.1)

This invention relates to methods and apparatus for providing a composite picture in telecasting.

It is often desirable in television programming to insert a particular subject upon a desired background, the resulting picture being termed a montage. In order to produce the desired montage, it is apparent that in effect, a suitable hole must be cut in the background scene and the subject inserted therein. Previously employed methods relied upon a first television camera to pick up the subject and a second camera to pick up the background. The video signal obtained from the subject camera was supplied to suitable circuitry to form keying pulses in order to produce a hole of the proper size in the background video signals, the subject video signals also being mixed with the background signals in a montage amplifier to fill in the hole and complete the composite picture.

However, difficulties were encountered in the above process because it was impossible to obtain subject video signals that would positively key the montage amplifier. In attempting to obtain such keying signals, a black background was ordinarily employed behind the subject to provide as much contrast as possible. However, if any portion of the subject was almost as black as the background, unwanted keying in the montage amplifier would result. Thus, it was necessary to mix white powder with dark hair, provide light costumes for subject actors, and make certain that shadows in the clothing were not in evidence. Alternatively, if a white background was employed, the same problems occurred with white portions of the subject. If the brightness of the white background was increased, the problem of halation was encountered which proved impossible to eliminate satisfactorily.

Accordingly, it is an object of the present invention to overcome the above-outlined defects of prior montaging methods and apparatus.

It is another object of the present invention to provide methods and apparatus for obtaining a positive keying signal for producing a montage of a subject on a background scene.

It is a further object of the invention to employ two television pickups in combination with a light projector and light polarizing elements to obtain a positive keying signal for producing a montage of a subject on a background scene.

It is still another object of the invention to employ a television camera in combination with a light projector and light polarizing elements on a rotating device to obtain a montage of a subject on a background scene.

These and further objects of the invention are accomplished by providing a first television camera for supplying signals representative of a background scene to switchnig amplifier means. A second television camera, synchronized with the first camera, views a normally illuminated subject in front of a reflex reflector screen with a reflectivity along the incident light axis many times greater than the subject, polarized light rays being directed towards the light reflecting screen and the resulting reflected polarized light rays being blocked by polarizing elements from the second television camera. Signal generating means cooperating with the polarizing elements function to supply keying signals to the switching amplifier means. To complete the system, subject signals are furnished to the switching amplifier means by virtue of the second camera's response to reflected normal illumination on the subject.

In one embodiment of the invention, a third television camera cooperates with the polarizing elements to generate keying signals.

In another embodiment of the invention, a rotating member carrying the light polarizing elements functions to block the polarized light rays from the second camera, and the signal generating means includes the second television camera which cooperates with the rotating member to supply keying signals to the switching amplifier means.

These and further objects and advantages of the invention will be more readily understood when the following description is read in connection with the accompanying drawings in which.

Figure 1:
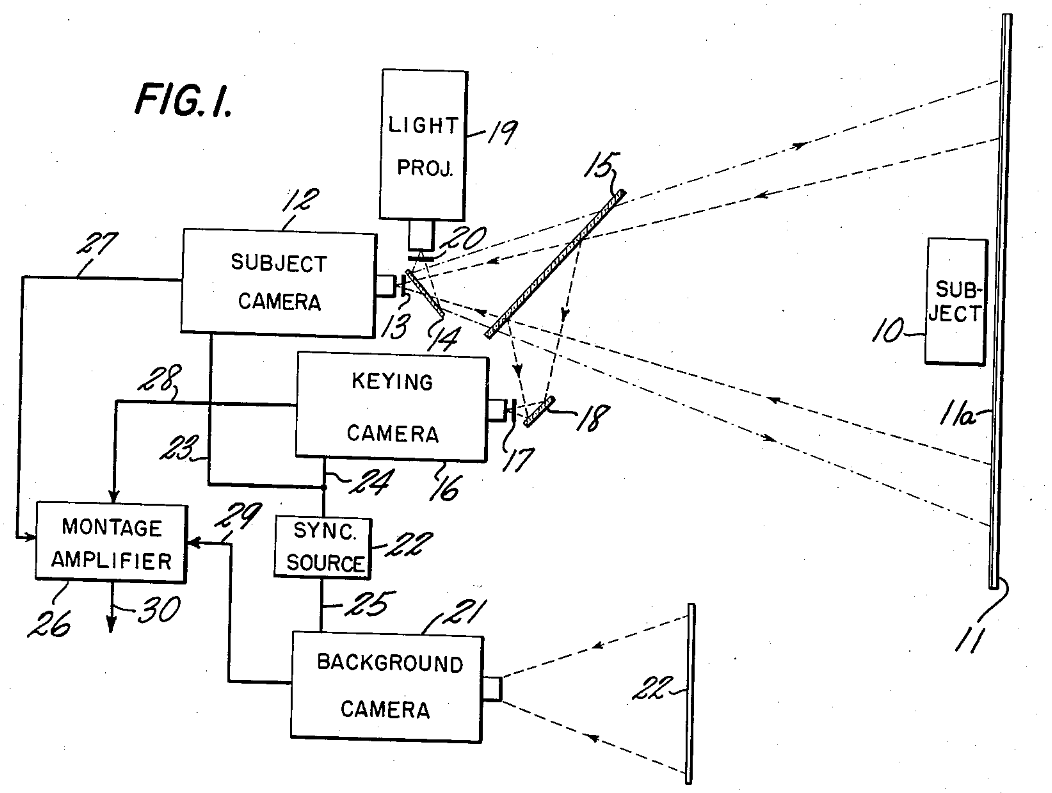
Figure 1 is a schematic block diagram of apparatus employed to produce a montage in accordance with the present invention which includes a plan view of certain of the optical elements therein.

Referring to a typical embodiment of the invention with particular reference to Figure 1, a subject 10 to be inserted in a background scene is positioned in front of a reflex screen 11 faced with a layer of elliptical beads 11a, this material being sold under the trade name of "Scotchlite," and described in U.S. patents Nos. 2,294,930 and 2,379,741. Reflex reflecting screens have the property of reflecting a large percentgae of the light incident thereon (high reflectivity) within a small angle of the axis of the incident light. For example, the layer of elliptical beads 11a has a reflectivity about 100 times as great as a white shirt, about the most reflective material a subject actor would wear. Further, the reflected light retains the polarization of the incident light. Of course, other material having such properties may be substituted for the layer of elliptical beads.

A subject television camera 12 views the subject 10 along an axis through a light polarizing element 13, a 50% mirror 14 at an angle of 45 degrees to the camera lens, and a 25% mirror 15 at an angle of 45 degrees to the television lens and perpendicular to the mirror 14. The mirror 15 reflects 25% of the light incident thereon from the layer 11a. It will be understood that the mirrors 14 and 15, commonly termed beam-splitting mirrors, are not limited to the above-described reflectivities which have been found suitable with the particular apparatus employed. Preferably, the light polarizing element 13, which functions as a filter, is shaped from the material sold under the trade name "Polaroid."

A keying television camera 16 views the subject 10 along the same axis as the subject camera 12 through a light polarizing element 17, a mirror 18 at 45 degrees to the camera lens and the 25% mirror 15. If desired, the mirror 18 may be omitted, the camera 16 viewing the mirror 15 directly through the light polarizing element 17.

A light projector 19 is positioned adjacent to the subject camera 12 and illuminates with diverging light rays directed along the viewing axis the subject 10 and the layer **11*a* through a light polarizing element 20, the mirror 14 and the mirror 15. In order to assure the reception by the cameras 12 and 16 of the desired light rays, the light polarizing elements 13 and 20 must have their planes of polarization at substantially 90 degrees to each other while the light polarizing elements 17 and 20 must have substantially the same planes of polarization. If desired, the light polarizing element 17 may be entirely omitted, its primary function being to minimize the entry of stray light into the keying camera 16**.

A background television camera 21 is positioned to view a scene 22 that will provide a background for the subject 10 to produce a desired composite picture or montage. Thus, the scene 22 may be a slide, a film clip, a set or any other suitable background scene arrangement.

A synchronizing source 22 synchronizes the scanning of the television cameras 12, 16 and 21 through conduits 23, 24 and 25, respectively. The video signals from the television cameras 12, 16 and 21 are supplied to a conventional montage amplifier 26 through conduits 27, 28 and 29, respectively, and an output conduit 30 leading from the montage amplifier 26 carries the composite video signals representing the montage of the subject 10 on the background scene 22.

Figure 2:
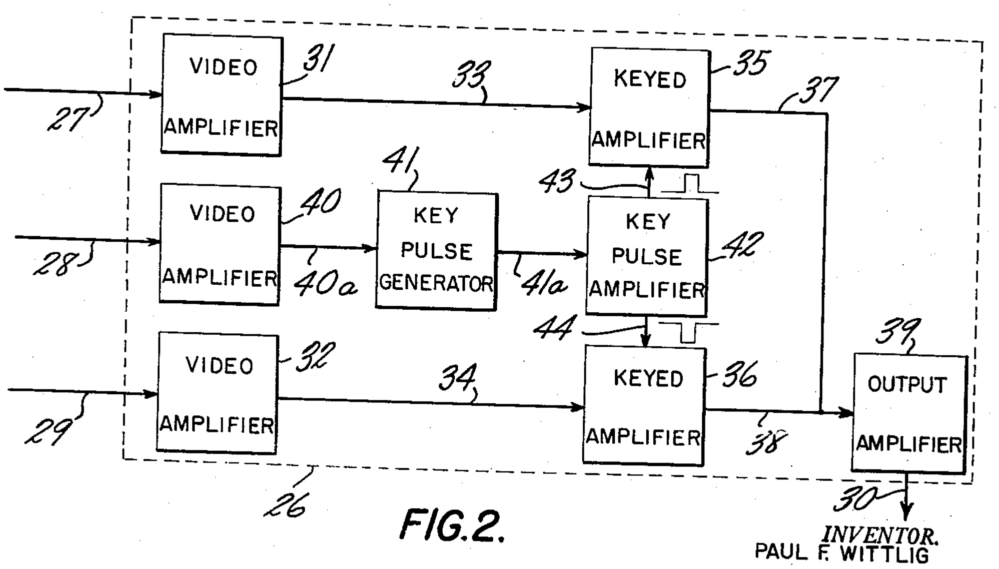
Figure 2 is a schematic block diagram of a montage amplifier that may be employed with the apparatus illustrated in Figure 1.

A montage amplifier 26 that may be employed with the present invention is shown in Figure 2. The signals from the subject camera 12 and the background camera 21 are coupled by the conduits 27 and 29 to video amplifiers 31 and 32, respectively. After amplification, the video signals are supplied by conduits 33 and 34 to keyed amplifiers 35 and 36, respectively, and coupled by conductors 37 and 38, respectively, to an output amplifier 39 furnishing the composite video signals to the conduit 30.

The video signals from the keying camera 16 are supplied to a video amplifier 40 and coupled after amplification by a conduit **40*a* to a key pulse generator 41. The signals from the keying camera 16 are shaped, as will be explained in detail below, to produce keying pulses of the proper duration from the generator 41 which are supplied by a conduit 41*a* to a key pulse amplifier 42. Through normal inversion circuits, the keying pulses are inverted in the key pulse amplifier 42 and applied in opposite phase through conduits 43 and 44 to the suppressors in the keyed amplifiers 35 and 36, respectively. Thus, the two video signals from the cameras 12 and 21 share the time of each scanning line in a manner determined by the keying signals from the keying camera 16**.

In a typical operation of the present invention, a subject 10, such as a person to be inserted on a landscape scene, is positioned in front of the screen 11 which carries the layer of elliptical beads **11*a*, the scene being illuminated by conventional studio light sources (not shown). Energization of the light projector 19 serves to further illuminate the subject 10 and the layer of elliptical beads 11*a* with vertically polarized light rays, assuming the plane of polarization of the light polarizing element 20 to be vertically oriented. Since the reflectivity of the layer 11*a* along the axis of the incident light rays is far greater than that of most other materials being, for example, about 200 times greater than white paint and about 100 times greater than a white shirt, high intensity vertically polarized light rays will be reflected from the layer of elliptical beads 11*a*. These high intensity light rays are further reflected by the mirrors 15 and 18 through the vertically oriented light polarizing element 17 to the keying camera 16. However, the reflected vertically polarized light rays will not reach the subject camera 12 since the plane of polarization of the light polarizing element 13** is horizontally oriented.

It may be desirable to illuminate the subject 10 slightly above the normal level to overcome the filtering effect of the element 13. However, the light rays furnishing such illumination will be somewhat diffused and not projected from the axis along which the television camera 12 views the subject 10. Accordingly, the subject camera 12 will view the subject 10 against a grey background. The illumination of the subject 10 may, however, be normal if the sensitivity of the subject camera 12 is increased sufficiently to compensate for the loss of light due to the filter 13. Accordingly, the subject camera 12 will furnish video signals representing a normal picture of the subject 10.

On the other hand, the high intensity vertically polarized light rays reflected from the layer of elliptical beads **11*a* and reaching the keying camera 16 through the filter 17 will be far above the normal white level while such light rays reflected from the subject 10 will be at a substantially lower intensity, due to its lower reflectivity. Therefore, the sensitivity of the keying camera 16 is optically or electrically reduced, or reduced by both methods, to lower the white intensity to the normal level. However, due to the great contrast in brightness between the subject 10 and the surface 11*a*, the subject 10 will now appear to the camera 16 as a black silhouette against a white background. Accordingly, it will be apparent that a single scanning line of the keying camera 16 will present the subject 10 as a more or less square pulse with a clear line of demarcation between the subject 10 and the layer 11*a***.

Examining any one scanning line, video signals will be supplied to the montage amplifier 26 from the cameras 12 and 21 and a keying signal will be furnished the montage amplifier from the keying camera 16. The keying signals produce key pulses in the generator 41 which are coupled by the key pulse amplifier 42 in opposite phase to the keyed amplifiers 35 and 36. Thus, the portion of the keying signals representing the surface **11*a* will open the amplifier 36 and close the amplifier 35 so that background video signals will appear at the output conduit 30. Further, the portion of the keying signals representing the subject 10 will generate a keying pulse to open the amplifier 35 and close the amplifier 36 so that video signals representing the subject 10 will appear at the conduit 30. Accordingly, the composite video signal on the conduit 30 will represent the montage formed by the subject 10 on the background scene 22**.

It will be evident that the reflecting layer **11*a* on the screen 11** may be formed of any material other than elliptical beads that will efficiently reflect light. However, it must be kept in mind that the material used must not destroy the polarization of the light projected thereon.

Both of the television cameras 12 and 16 may, of course, be housed in a single casing to provide better mechanical and optical registration.

Figures 3, 4, 5:
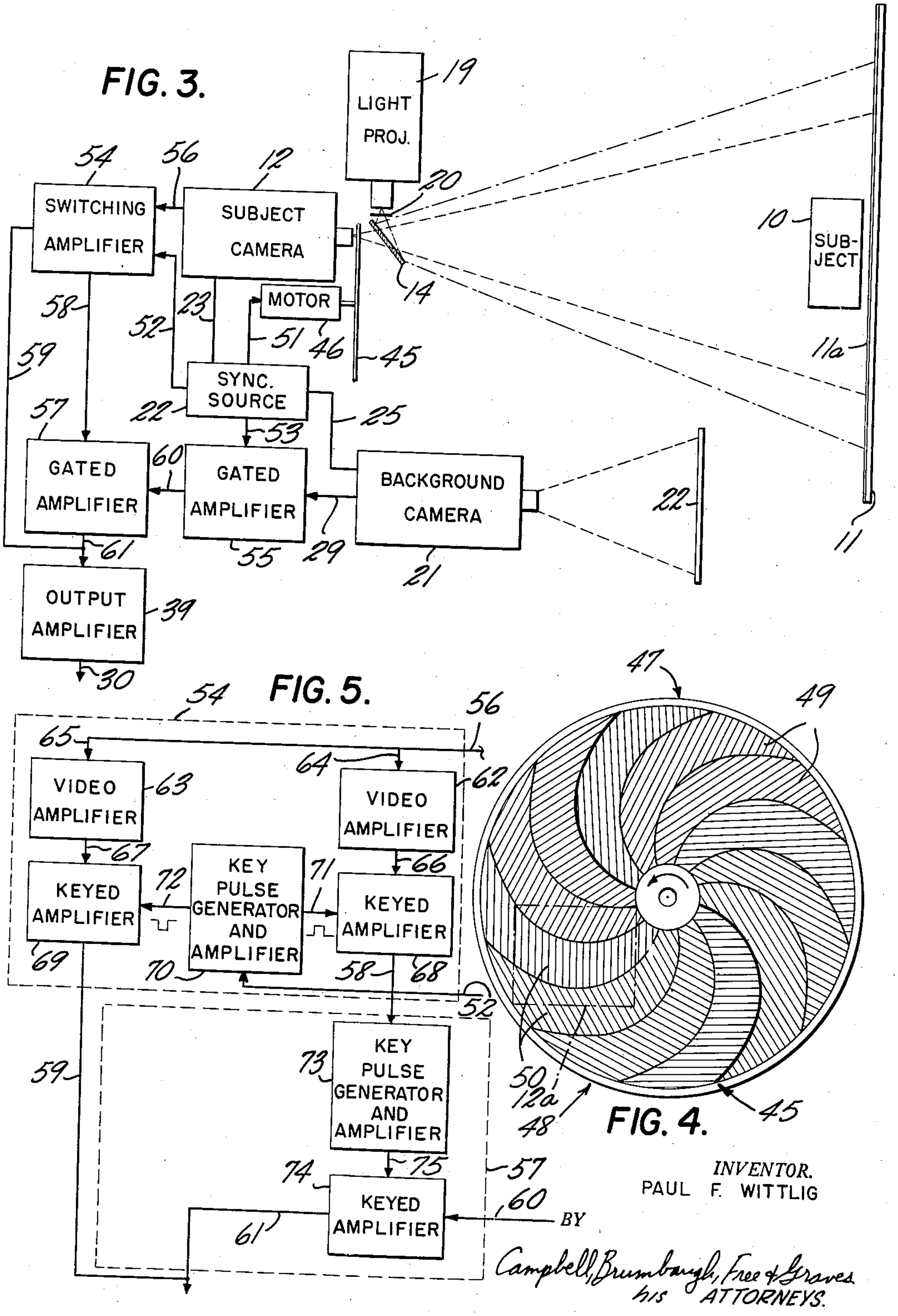
Figure 3 is a schematic block diagram of further apparatus in accordance with the present invention which includes a plan view of certain of the optical elements therein.
Figure 4 is a view of the polarizing wheel employed in Figure 3.
Figure 5 is a schematic block diagram in greater detail of circuits employed in the apparatus shown in Figure 3.

Turning to another embodiment of the invention with particular reference to Figure 3, the camera 12 is shown viewing the subject 10 and screen 11, provided with a facing **11*a* of elliptical beads, through the beam splitting mirror 14. The light projector 19 performs the same function as in Figure 1 by projecting light rays through the light polarizing element 20 which will be assumed to have a vertical plane of polarization. However, in this modification a disc 45 rotated by a motor 46 is positioned between the camera 12 and the mirror 14 in place of the polarizing filter 13**.

Examining the disc 45 in greater detail with particular reference to Figure 4, it is formed in two halves 47 and 48 each including a plurality of segments 49 and 50, respectively. The segments 49 and 50 of the disc 45 have the configuration described in the Patent No. 2,304,081 to Goldmark, but any other type of disc may be employed as desired. It will be understood that a filter drum or other type of filter may be employed instead of a disc. An area **12*a* superimposed in broken outline on the disc 45** in Figure 4 is the area through which the camera 12 scans the subject 10 and screen 11, the scanning proceeding from the top to the bottom of the area 12*a*.

The segments 49 and 50 are formed from light polarizing material such as that sold under the trade name "Polaroid." The segments 50 are oriented in the portion 48 so that their planes of polarization are substantially vertical while in front of the camera 12. It will be apparent that with the six segments 50 in the portion 48, the plane of polarization will vary somewhat from the vertical and if desired, a greater number of segments may be employed to decrease such variation. In a similar fashion, the light polarizing segments 49 are oriented to provide horizontally polarized filters in front of the camera 12. If desired, the light polarizing segments 48 may be replaced by transparent material, their primary function being to minimize the entry of stray light into the camera 12.

It will be evident that the vertically polarized light rays obtained by reason of the light rays from the light projector 19 passing through the light polarizing filter 20 will be reflected from the screen facing 11*a* and the subject 10 and will be received by the camera 12 only when the vertically polarized segments 50 are in front of the camera 12. Thus, when the segments 49 pass in front of the camera 12, the vertically polarized light rays reflected from the facing 11*a* will be blocked by the horizontally polarized filter elements 49.

The synchronizing source 22 synchronizes the scanning of the television cameras 12 and 21 through the conduits 23 and 25, respectively. The synchronizing source 22 is also joined by a conduit 51 to the motor 46 and by conduits 52 and 53 to a switching amplifier 54 and a gated amplifier 55, respectively. The video signals from the television camera 12 are supplied to the switching amplifier 54 through a conduit 56 and are selectively coupled to a gated amplifier 57 through a conduit 58 or to the output amplifier 39 through a conduit 59 in accordance with the synchronizing source 22. The video signals from the television camera 21 are selectively coupled through the gated amplifier 55 to the gated amplifier 57 by means of a conduit 60 and continue through the gated amplifier 57 to a conduit 61 leading to the output amplifier 39.

Referring to Figure 5, circuits are illustrated that may be employed in the switching amplifier 54 and the gated amplifier 57. The video signals from the camera 12 on the conduit 56 are furnished to video amplifiers 62 and 63 on conduits 64 and 65, respectively. Conduits 66 and 67 couple these signals to keyed amplifiers 68 and 69 controlled by a key pulse generator and amplifier 70 through conduits 71 and 72, respectively. Synchronizing signals from the synchronizing source 22 are supplied to the key pulse generator and amplifier 70 on the conduit 52. Conventional conversion circuits are incorporated in the key pulse generator and amplifier 70 so that out of phase pulses are supplied to the keyed amplifiers 68 and 69 to key one of these amplifiers off while the other is keyed on.

The signals coupled through the keyed amplifier 68 are furnished by the conduit 58 to a key pulse generator and amplifier 73 which, in turn, controls a keyed amplifier 74 through a conduit 75. Video signals coupled through the gated amplifier 55 (Figure 3), which is similar to the gated amplifier 57 in that it may include a key pulse generator and amplifier, are furnished on the conduit 60 to the keyed amplifier 74 and are selectively coupled therethrough to the output conduit 61.

The video signals passing through the keyed amplifier 69 are supplied to the output amplifier 39 by the conduits 59 and 61.

In operation, the filter disc 45 is synchronized by the synchronizing source 22 so that the portions 47 and 48 are sequentially in front of the lens of the camera 12 each for a single field. Thus, since a vertical plane of polarization for the element 20 has been assumed, when the vertically polarized segments 50 are in front of the lens of the camera 12, the high intensity light rays from the projector 19 will impinge thereon and as described above in connection with Figure 1, the subject 10 will appear to be substantially black and surrounded by a high intensity white background. At this time, the circuit elements will be adjusted so that the synchronizing source 22 will cause the generation of a pulse by the key pulse generator and amplifier 70 to open the keyed amplifier 68 and to close the keyed amplifier 69, thereby furnishing the video signals on the conduit 56 to the key pulse generator and amplifier 73 in the gated amplifier 57. In addition, during this field the synchronizing source 22 will be arranged to open the gated amplifier 55 so that video signals from the camera 21 will be coupled by the conduit 60 to the keyed amplifier 74. The key pulse generator and amplifier 73 is adjusted to permit the keyed amplifier 74 to transmit the video signals from the camera 21 except when the video signals from the camera 12 are produced in response to the relatively dark subject 10. In this latter instance, the keyed amplifier 74 will be blocked and it will be apparent that the composite output on the conduit 61 will represent the background 22 with a hole therein the size of the subject 10.

As soon as the disc 45 is rotated so that the horizontally polarized portion 47 appears in front of the lens of the camera 12, the synchronizing source 22 will change the polarity of the pulse generated by the key pulse generator and amplifier 70 to block the keyed amplifier 68 and open the keyed amplifier 69. This will result in the video signals from the camera 12, which are now representative of the subject 10 since the high intensity polarized light rays are blocked from the horizontal polarized filter 47, being coupled through the video amplifier 63, the keyed amplifier 69 and the conduit 59 to the output amplifier 39. Further, the synchronizing source 22 will effectively block the gated amplifier 55 to preclude information being transmitted to the gated amplifier 57 from the background camera 21. Thus, during this field, signals furnished to the output amplifier 39 will be indicative of the subject 10.

Accordingly, it is evident that alternate fields present the background with a hole the size of the subject 10 therein and the subject and these fields are sequentially amplified by the output amplifier 39. Due to a high field rate, for example 60 per second, the background and subject will appear as a single composite picture.

It will be understood that the above-described embodiments of the invention are illustrative only and modifications thereof will occur to those skilled in the art. For example, the physical position of the subject and keying cameras together with the filter elements may be interchanged. Therefore, the invention is not to be limited to the specific apparatus disclosed herein but is to be defined by the appended claims.

I claim:

1. In a television montage system, a pair of television pickups effectively viewing along substantially a single axis a reflex reflecting screen, a source of normal illumination in front of the screen, a source of diverging polarized light rays, means for directing said diverging polarized light rays to the screen substantially on said axis, means for transmitting the light rays reflected from the screen to one of said pickups to cause a subject in front of the screen to appear to the one pickup as a black silhouette against a white background, and means for blocking said reflected light rays from the other of said pickups to cause the subject to appear normally illuminated to the other pickup.

2. In a television montage system, a pair of television cameras effectively viewing along substantially a single axis a reflex reflecting screen, a source of normal illumination in front of the screen, a source of polarized light rays, means for directing said polarized light rays to the screen substantially along said axis, means for transmitting the polarized light rays reflected from the screen to one of said cameras to cause a subject in front of the screen to appear to the one camera as a black silhouette against a white background, and means including a light polarizing element having its plane of polarization substantially perpendicular to the plane of polarization of said reflected polarized light rays for blocking said reflected light rays from the other of said cameras to cause the subject to appear normally illuminated to the other camera.

3. In a television montage system, a pair of adjacently mounted television cameras viewing a normally illuminated subject in front of a light reflecting screen, optical means cooperating with said cameras to afford substantially a single viewing axis therefor, a source of diverging polarized light rays, means for directing said diverging polarized light rays substantially along said axis for further illuminating the subject and the screen, the screen having a reflectivity along said axis many times greater than the subject, means for transmitting the polarized light rays reflected from the subject and the screen to one of said cameras to cause the subject in front of the screen to appear to the one camera as a black silhouette against a white background, and means including a light polarizing element having its plane of polarization substantially perpendicular to the plane of polarization of said reflected polarized light rays for blocking said reflected polarized light rays from the other of said cameras, said last-mentioned means transmitting reflected light rays produced by the normal illumination of the subject to the other of said cameras to cause the subject to appear normally illuminated to the other camera.

4. A system as defined in claim 3 wherein said light reflecting screen comprises an element faced with elliptical beads.

5. In a television montage system, a pair of adjacently mounted television cameras viewing a normally illuminated subject in front of a reflex reflecting screen, a first beam splitting mirror cooperating with said cameras to afford substantially a single viewing axis therefor, a source of diverging polarized light rays disposed adjacent to said cameras, a second beam splitting mirror for directing said diverging polarized light rays substantially along said axis, means including said first mirror for transmitting the polarized light rays reflected to one of said cameras to cause the subject in front of the screen to appear to the one camera as a black silhouette against a white background, and means including said first and second mirrors and a light polarizing element having its plane of polarization substantially perpendicular to the plane of polarization of said reflected polarized light rays for blocking said reflected polarized light rays from the other of said cameras, said last-mentioned means transmitting reflected light rays produced by the normal illumination of the subject to the other of said cameras to cause the subject to appear normally illuminated to the other camera.

6. A system as defined in claim 5 wherein said light reflecting screen comprises an element faced with elliptical beads.

7. A system as defined in claim 5 wherein said means including said first mirror also includes a light polarizing element having its plane of polarization substantially parallel to the plane of polarization of said reflected polarized light rays.

8. A television montage system comprising a first television camera viewing a reflex reflecting screen along an axis, a source of normal illumination in front of the screen, a source of diverging polarized light rays, means for directing said diverging polarized light rays to the screen substantially along said axis, a rotating member positioned in front of and synchronized with said first camera and including at least one polarized filter portion, the rotating member selectively transmitting the polarized light rays reflected from the screen to the first camera to cause a subject in front of the screen to appear to the first camera as a black silhouette against a white background, the polarized filter portion having its plane of polarization oriented to be substantially perpendicular to the plane of polarization of said reflected light rays for selectively blocking said reflected light rays from the first camera to cause the subject to appear normally illuminated to the first camera, a switching amplifier, means for transmitting the signals generated by said first television camera to said switching amplifier, a second television camera synchronized with said first camera for generating signals representing a background scene, a gated amplifier, means for selectively coupling signals from the switching amplifier and the second television cameras to said gated amplifier, an output circuit, means for coupling composite signals from said gated amplifier representative of the signals from said first and second television cameras to said output circuit, and means for selectively coupling signals from said switching amplifier directly to said output means.

9. A television montage system comprising a montage amplifier, a first television camera supplying signals representing a background scene to said montage amplifier, second and third television cameras synchronized with said first camera, said second and third cameras effectively viewing along substantially a single axis a normally illuminated subject in front of a light reflecting screen, a source of diverging polarized light rays, means for directing said diverging polarized light rays to the subject and the screen substantially along said axis, the screen having a reflectivity along said axis many times greater than the subject, means for transmitting the polarized light rays reflected from the screen to said second camera for producing keying signals, means including a light polarizing element having its plane of polarization substantially perpendicular to the plane of polarization of said reflected polarized light rays for blocking said reflected light rays from said third camera, said last-mentioned means transmitting reflected light rays produced by the normal illumination of the subject to said third camera for generating subject signals, and means for supplying said keying signals and said subject signals to said montage amplifier.

10. A television montage system comprising a montage amplifier, a first television camera supplying signals representing a background scene to said montage amplifier, second and third adjacently mounted television cameras synchronized with said first camera, said second and third cameras viewing a normally illuminated subject in front of a reflex reflecting screen, optical means cooperating with said second and third cameras to afford substantially a single viewing axis therefor, a source of diverging polarized light rays, means for directing said diverging polarized light rays substantially along said axis for further illuminating the subject and the screen, means for transmitting the polarized light rays reflected from the subject and the screen to said second camera for producing keying signals, means including a light polarizing element having its plane of polarization substantially perpendicular to the plane of polarization of said reflected polarized light rays for blocking said reflected polarized light rays from said third camera, said last-mentioned means transmitting reflected light rays produced by the normal illumination of the subject to said third camera for generating subject signals, and means for supplying said keying signals and said subject signals to said montage amplifier.

11. A system as defined in claim 10 wherein said light reflecting screen comprises an element faced with elliptical beads.

12. A television montage system comprising switching amplifier means, a first television camera supplying signals representing a background scene to said switching amplifier means, a second television camera synchronized with the first television camera, said second television camera viewing along an axis a normally illuminated subject in front of a reflex reflecting screen, a source of diverging polarized light rays, means for directing the diverging polarized light rays towards the screen, the screen reflecting many times more incident polarized light along said axis than the subject, means for blocking at least some of the reflected polarized light rays from said second television camera, signal generating means cooperating with the blocking means for supplying keying signals to the switching amplifier means, means for transmitting reflected light rays produced by said normal illumination of the subject to said second television camera for generating subject signals, and means for supplying said subject signals to said amplifier means.

13. In a method of producing a television montage, the steps of providing a normally illuminated subject, polarizing light rays and directing them towards the subject, reflecting from beyond the subject many times more of the polarized light rays than the subject reflects, transmitting at least some of the reflected polarized light rays to a television pickup viewing the subject to cause the subject to appear to the television pickup as a black silhouette against a white background, transmitting the reflected light rays produced by normal illumination of the subject to the television pickup, and blocking at least some of the reflected polarized light rays from the television pickup to cause the subject to appear normally illuminated to the television pickup.

14. In a method of producing a television montage, the steps of providing a normally illuminated subject, polarizing light rays and directing them towards the subject, reflecting from beyond the subject many times more of the polarized light rays than the subject reflects, transmitting the reflected polarized light rays to a first television camera viewing the subject to cause the subject to appear to the first television camera as a black silhouette against a white background, transmitting the reflected light rays produced by normal illumination of the subject to a second television camera viewing the subject, and blocking the reflected polarized light rays from the second television camera to cause the subject to appear normally illuminated to the second television camera.

15. In a method of producing a television montage, the steps of providing a normally illuminated subject, polarizing light rays and directing them towards the subject, reflecting from beyond the subject many times more of the polarized light rays than the subject reflects, transmitting during first selected intervals reflected polarized light rays to a television camera viewing the subject to cause the subject to appear to the television camera as a black silhouette against a white background, transmitting reflected light rays produced by normal illumination of the subject to the television camera, and blocking during second selected intervals the reflected polarized light rays from the television camera to cause the subject to appear normally illuminated to the television camera.

16. In a television montage system, television means including first and second pickups viewing along an axis a normally illuminated subject in front of a light reflecting screen, a source of diverging polarized light rays, means for directing the diverging polarized light rays along the axis towards the subject and the screen, the screen having a reflectivity many times greater than that of the subject and reflecting many times more of the diverging polarized light rays toward the polarized light source than the subject reflects toward the source, means for transmitting the polarized light rays reflected from the screen to the first pickup in the television means to cause the subject in front of the screen to appear to the first pickup as a black silhouette against a white background, and means for transmitting reflected light rays produced by the normal illumination of the subject to the second pickup in said television means, said last mentioned reflected light ray transmitting means blocking the reflected polarized light rays from said second pickup to cause the subject to appear normally illuminated to the second pickup.

17. A television montage system comprising switching amplifier means, a first television camera supplying signals representing a background scene to said switching amplifier means, a second television camera synchronized with the first television camera, said second television camera viewing along an axis a normally illuminated subject in front of a reflux reflecting screen, a source of diverging polarized light rays, means for directing the diverging polarized light rays along the axis towards the subject and the screen, the screen reflecting many times more incident polarized light rays toward the polarized light source than the subject reflects toward the source, a rotating member positioned in front of and synchronized with said second television camera and including at least one polarized filter portion, the rotating member selectively transmitting the polarized light rays reflected from the screen to the second camera to cause a subject in front of the screen to appear to the second camera as a black silhouette against a white background, the second camera generating and supplying keying signals to the switching amplifier means representative of the black silhouette against the white background, the polarized filter portion having its plane of polarization oriented to be substantially perpendicular to the plane of polarization of the reflected light rays for selectively blocking the reflected polarized light rays from the second camera, said polarized filter portion transmitting reflected light rays produced by the normal illumination of the subject to said second camera for the generation of subject signals representative of the normally illuminated subject, and means for supplying said subject signals to said switching amplifier means.

References Cited in the file of this patent

UNITED STATES PATENTS

| | | |
|---|---|---|
| 2,204,049 | Planskoy | June 11, 1940 |
| 2,527,593 | Stadler | Oct. 31, 1950 |
| 2,705,259 | Lant | Mar. 29, 1955 |
| 2,727,427 | Jenkins | Dec. 20, 1955 |
| 2,753,395 | Lawrence | July 3, 1956 |
| 2,871,465 | Nielsen | Jan. 27, 1959 |

FOREIGN PATENTS

| | | |
|---|---|---|
| 638,937 | Great Britain | June 21, 1950 |

UNITED STATES PATENT OFFICE

CERTIFICATION OF CORRECTION

Patent No. 2,969,428 January 24, 1961

Paul F. Wittlig

It is hereby certified that error appears in the above numbered patent requiring correction and that the said Letters Patent should read as corrected below.

Column 2, line 43, for "percentgae" read -- percentage --; column 6, lines 74 and 75, before "polarized", each occurrence, insert -- diverging --.

Signed and sealed this 27th day of June 1961.

(SEAL)
Attest:

ERNEST W. SWIDER
Attesting Officer

DAVID L. LADD
Commissioner of Patents